United States Patent
Morita et al.

[11] Patent Number: 6,095,006
[45] Date of Patent: Aug. 1, 2000

[54] CLUTCH DRUM, METHOD OF MANUFACTURING CLUTCH DRUM AND APPARATUS FOR FORMING TOOTH PROFILE

[75] Inventors: Tsukasa Morita; Masanobu Hayasaka, both of Kanagawa-ken, Japan

[73] Assignee: Nissan Motor Co., Ltd., Yokohama, Japan

[21] Appl. No.: 09/040,930

[22] Filed: Mar. 19, 1998

[30] Foreign Application Priority Data

Mar. 25, 1997 [JP] Japan ..................................... 9-072050

[51] Int. Cl.⁷ .................................................. F16H 55/17
[52] U.S. Cl. ............................................ 74/434; 192/70.2
[58] Field of Search ............................... 74/434; 192/70.2

[56] References Cited

U.S. PATENT DOCUMENTS

| | | |
|---|---|---|
| 2,841,452 | 10/1974 | Newsock et al. . |
| 3,992,932 | 11/1976 | Maurice et al. . |
| 4,014,619 | 3/1977 | Good et al. . |
| 4,089,097 | 5/1978 | Good et al. . |
| 4,813,522 | 3/1989 | Fujioka et al. . |
| 4,997,073 | 3/1991 | Fujioka et al. .......................... 192/70.2 |

*Primary Examiner*—David M. Fenstermacher
*Attorney, Agent, or Firm*—McDermott, Will & Emery

[57] ABSTRACT

At a time of manufacturing a clutch drum formed in a cup shape, having a peripheral wall formed in a tooth profile, and having a circumferential groove for mounting a snap ring in a portion close to an open end of an inside projecting portion, in a stage of forming a peripheral wall of a base material formed in a cup shape into a predetermined tooth profile, after forming in such a manner that a minimum outer diameter of the open end portion of the inside projecting portion is larger than a maximum diameter of the circumferential groove for the snap ring, a cutting process is given to the open end portion of the inside projecting portion 3, so that the circumferential groove is formed. Accordingly, a tooth profile having an uneven amount necessary for transmitting a rotation is secured and no extending portion is produced in the open end portion of the inside projecting portion.

10 Claims, 4 Drawing Sheets

CLUTCH DRUM, METHOD OF MANUFACTURING CLUTCH DRUM AND APPARATUS FOR FORMING TOOTH PROFILE

The content of Application No. TOKUGANHEI 9-72050, filed Mar. 25, 1997 in Japan, is hereby incorporated by reference.

BACKGROUND OF THE INVENTION

The present invention relates to a clutch drum, a method of manufacturing a clutch drum and an apparatus for forming a tooth profile which are used for manufacturing a clutch drum of an automatic transmission.

A clutch drum of an automatic transmission in accordance with a related art is formed in a cup shape and has a peripheral wall having a tooth profile. The clutch drum has a circumferential groove for mounting a snap ring in a portion close to an opening end of an inside (or inwardly) projecting portion on the peripheral wall. In order to manufacture the clutch drum, a tooth profile forming apparatus provided with a punch having an outer peripheral surface formed in a tooth profile and a die having an inner peripheral surface formed in a tooth profile is used. When the punch to which a base material having a cup shape is fitted is combined with the die, a peripheral wall of the base material is molded to a predetermined tooth profile between the outer peripheral surface of the punch and the inner peripheral surface of the die.

As shown in FIG. 1A, the peripheral wall Cw of the base material Cp has a tooth profile portion. A cross sectional shape of the tooth profile portion is not changed from an opening end thereof to a closed side thereof.

In the tooth profile portion of the peripheral wall Cw, a circumferential groove Cd for mounting a snap ring is formed. The circumferential groove Cd is formed by a cutting process. The circumferential groove Cd is formed at a portion close to the open end of the inside projecting portion Cm.

SUMMARY OF THE INVENTION

It is necessary for the clutch drum to sufficiently secure an uneven amount of the tooth profile portion of the peripheral wall Cw so as to transmit a rotation inside and outside the tooth profile portion. Accordingly, in order to make a formability of the peripheral wall Cw, it is desired to make a thickness of the peripheral wall Cw thin. Further, as shown in FIG. 1B, both end portions 101 in a peripheral direction among the inside projecting portion Cm of the peripheral wall Cw is extended in such a manner as to be thinner than a central portion 102 by a press molding. However, in the tooth profile portion of the peripheral wall Cw, a cross sectional shape thereof is not changed from the open end thereof to the closed side, and an outer diameter $\phi r1$ of the both end portions 101 in the inside projecting portion Cm is smaller than an outer diameter of the center portion 102. Accordingly, when the portion close to the open end of the inside projecting portion Cm is cut so as to form a circumferential groove Cd for mounting a snap ring, a groove diameter $\phi d1$ of the groove Cd is over the outer diameter $\phi r1$ of the both end portions 101 in the inside projecting portion Cm, so that there has been a possibility that an extending portion is partially produced at a bottom of the groove Cd. When the extending portion is produced in the groove Cd, a strength of the clutch drum is deteriorated. Further, it is necessary to remove a burr produced in the extending portion.

In order to correspond to this, when a total thickness of the clutch drum is made thick, a weight thereof is largely increased. Further, it is necessary to change a shape of a corresponding part with which the crutch is engaged to transmit a rotation. Accordingly, a cost thereof is increased. Still further, when the material of the clutch drum is changed to a material having a high strength, a cost is increased at that degree.

It is an object of the present invention to provide a clutch drum, a method of manufacturing a clutch drum and an apparatus for forming a tooth profile which forms a groove for mounting a snap ring together with securing a tooth profile necessary for transmitting a rotation and without producing an extending portion at a portion close to an open end of an inside projecting portion.

In order to achieve the object mentioned above, in accordance with a first aspect of the present invention, there is provided a method of manufacturing a clutch drum comprising;

a first step of forming a peripheral wall of a base material for a clutch drum formed in a cup shape into a tooth profile having an inside projecting portion and an outside projecting portion, and a second step of forming a circumferential groove for mounting a snap ring on a portion close to an open end of the inside projecting portion by cutting, wherein in the first step, a minimum outer diameter of the portion close to the open end of the inside projecting portion is made larger than a maximum diameter of the circumferential groove.

In accordance with the method mentioned above, as the peripheral wall of the base material is formed in a predetermined tooth profile, an uneven amount of the tooth profile necessary for transmitting a rotation is secured easily. Further, since the minimum outer diameter of the portion close to the open end of the inside projecting portion is made larger than the maximum diameter of the circumferential groove for the snap ring, a generation of an extending portion is avoided when the portion close to the open end of the inside projecting portion is cut to form the circumferential groove for the snap ring.

Accordingly, a strength is prevented from being deteriorated, and a removing operation of a burr is not necessary. As a result, it is realized that the clutch drum is made light and a cost thereof is reduced.

In accordance with a second aspect of the present invention, there is provided a method of manufacturing a clutch drum comprising;

a first step of forming a peripheral wall of a base material for a clutch drum formed in a cup shape into a tooth profile having an inside projecting portion and an outside projecting portion, and a second step of forming a circumerential groove for mounting a snap ring on a portion close to an open end of the inside projecting portion by cutting, wherein in the first step, the portion close to the open end of the peripheral wall is formed to be thicker than a closed side thereof, and in the second step, a maximum diameter of the circumferential groove is formed in such a manner as to be smaller than a minimum outer diameter of the portion close to the opening end of the inside projecting portion.

In accordance with the method mentioned above, as the peripheral wall of the base material is formed in a predetermined tooth profile, the minimum outer diameter of the portion close to the open end of the inside projecting portion made thicker than the other portions is larger than the maximum diameter of the circumferential groove for the snap ring. Accordingly, an uneven amount of the tooth profile necessary for transmitting a rotation is secured easily when the portion close to the open end of the inside projecting portion is cut to form the circumferential groove for the snap ring.

Accordingly, a weight of the clutch drum is slightly increased, however, a clutch drum having a higher strength at a degree of making the thickness of the portion close to the open end of the inside projecting portion having the circumferential groove for the snap ring formed thicker than the thickness of the other portion is manufactured.

In accordance with a third aspect of the present invention, there is provided a clutch drum of cup shape having a peripheral wall, comprising:

a tooth profile portion formed in the peripheral wall and having an inside projecting portion and an outside projecting portion; and a circumferential groove for mounting a snap ring on a portion close to an open end of the inside projecting portion by cutting; wherein a minimum outer diameter of the portion close to the open end of the inside projecting portion is larger than a maximum diameter of the circumferential groove.

DESCRIPTION OF THE PREFERRED EMBODIMENTS

An embodiment in accordance with the present invention will be described below with reference to the attached drawings.

Figure 1A:
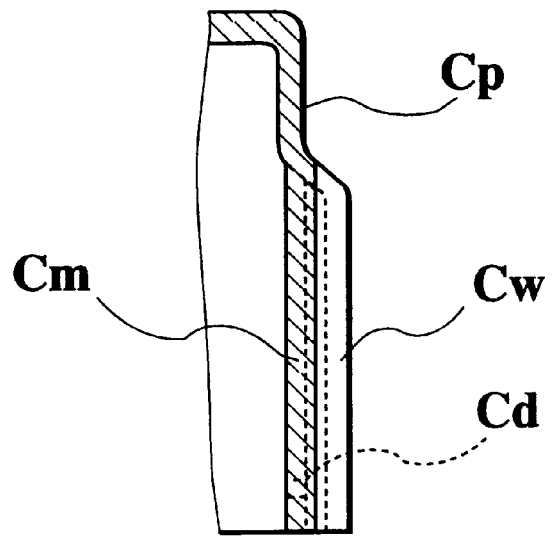
FIG. 1A is a vertical cross sectional view which partially shows a clutch drum formed by using a conventional apparatus for forming a tooth profile.
Figure 1B:
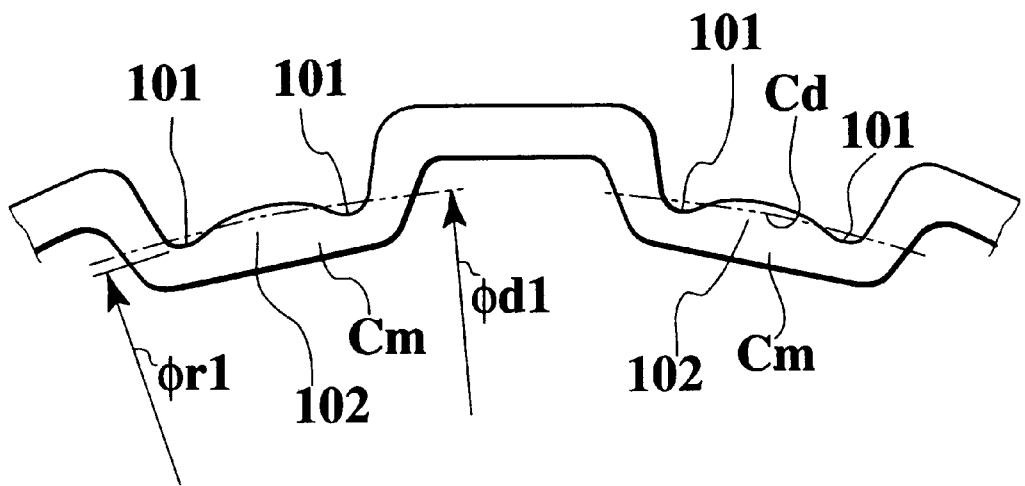
FIG. 1B is an end surface view which partially shows the clutch drum shown in FIG. 1A.
Figure 2A:
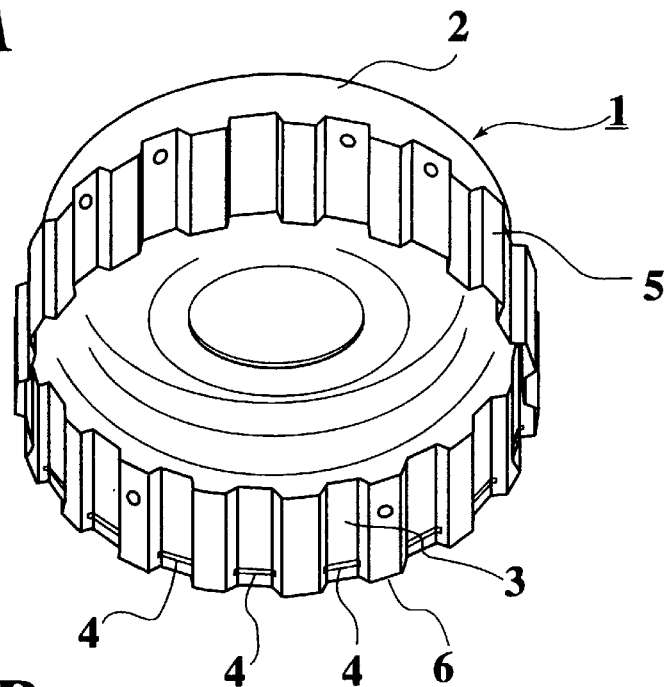
FIG. 2A is a perspective view as seen from a diagonal lower direction which shows a clutch drum manufactured by a method of manufacturing a clutch drum in accordance with a first embodiment of the present invention.
Figure 2B:
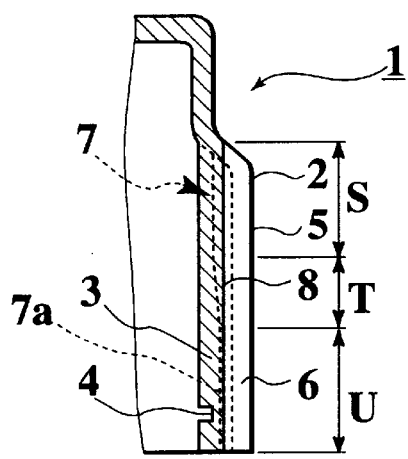
FIG. 2B is a vertical cross sectional view taken on line IIB—IIB of FIG. 2C which partially shows the clutch drum shown in FIG. 2A.
Figure 2C:
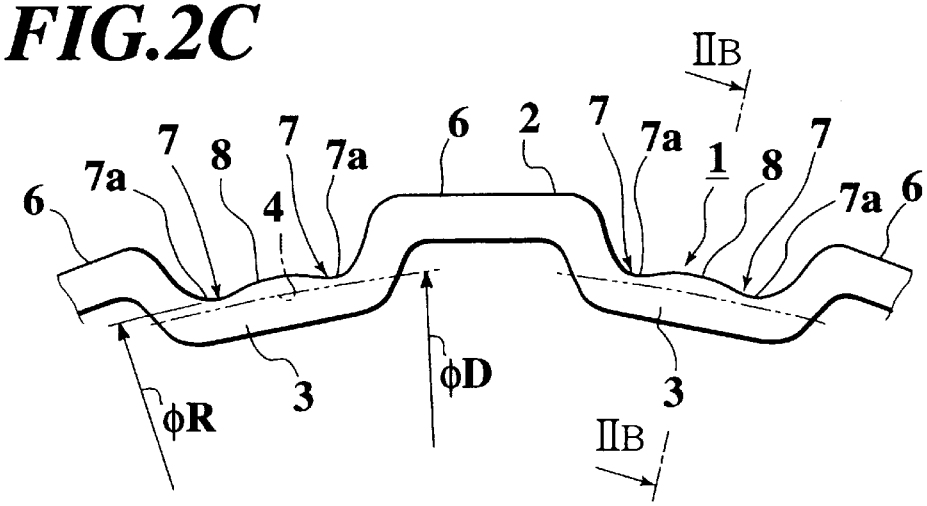
FIG. 2C is an end surface view which partially shows the clutch drum shown in FIG. 2A.
Figure 3A:
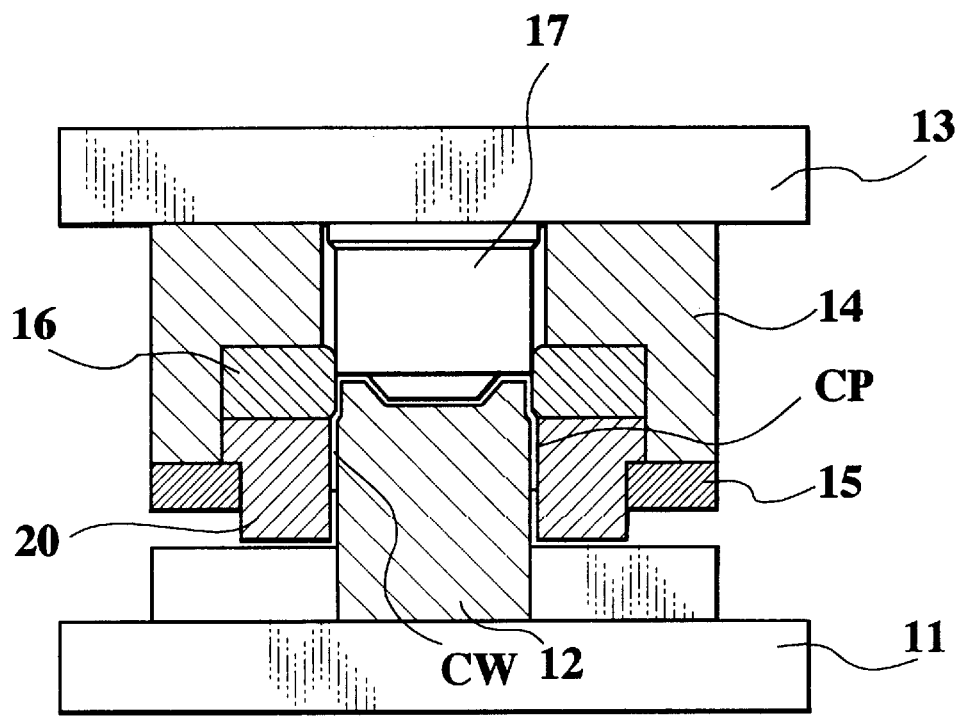
FIG. 3A is a vertical cross sectional view which shows an apparatus for forming a tooth profile in accordance with a first embodiment of the present invention.
Figure 3B:
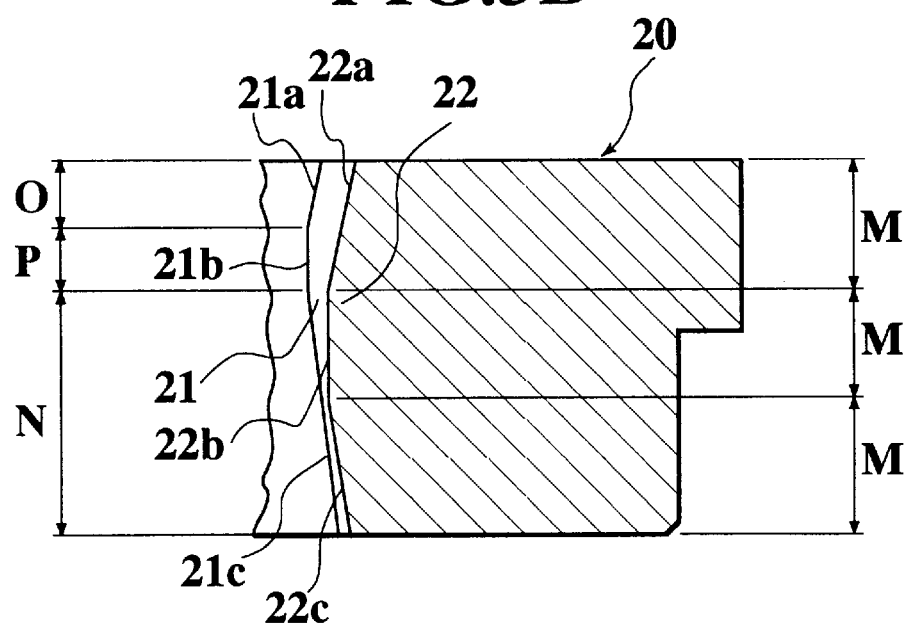
FIG. 3B is a vertical cross sectional view which shows a die shown in FIG. 3A.
Figure 4:
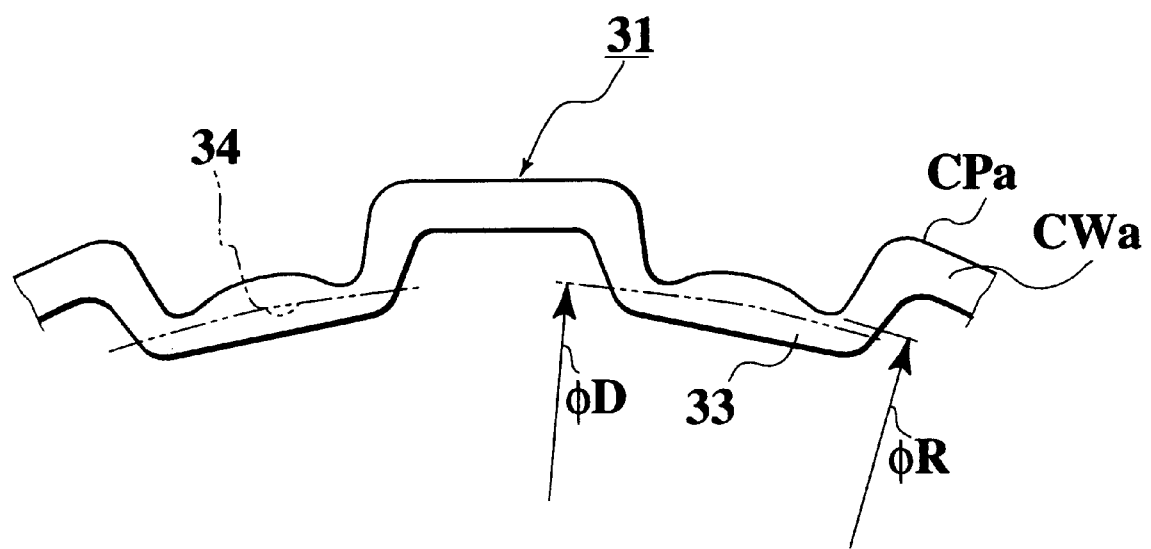
FIG. 4 is an end surface view which partially shows a clutch drum manufactured by a method of manufacturing a clutch drum in accordance with a second embodiment of the present invention.

FIGS. 2A, 2B and 2C show a clutch drum manufactured by a method of manufacturing a clutch drum in accordance with a first embodiment of the present invention and FIGS. 3A and 3B show an apparatus for forming a tooth profile in accordance with a first embodiment.

As shown in FIGS. 2A and 5, the clutch drum 1 is formed in a cup shape having a peripheral wall 2. A tooth profile portion 5 is formed in the peripheral wall 2. The tooth profile portion 5 of the peripheral wall 2 has an inside (inwardly) projecting portion 3 and an outside (or outwardly) projecting portion 6 which are alternately and continuously provided, and in the portion close to the open end of the inside projecting portion 3, a circumferential groove 4 for mounting a snap ring is formed.

As shown in FIG. 2B, in the clutch drum 1, a closed end section S, a center section T and an open end section U among the tooth profile portion 5 of the peripheral wall 2 respectively have a different sectional shape from each other. In the closed end section S and the center section T, a rotation is transmitted inside and outside thereof. On the contrary, in the open end section U, as shown in FIG. 2C, a minimum outer diameter $\phi R$ of the inside projecting portion 3 is formed in such a manner as to be greater than a predetermined groove diameter (a maximum diameter) $\phi D$ of the circumferential groove 4.

As shown in FIG. 3A, an apparatus for forming a tooth profile used at a time of manufacturing the clutch drum 1 is provided with a female die 11, a punch 12, a male die 13, a step forming die 16, a tooth profile forming die 20 and a pad 17. The punch 12 is fixed to the female die 11 and has an outer peripheral surface formed in an outer tooth profile. The male die 13 moves close to and apart from the female die 11. The step forming die 16 and the tooth profile forming die 20 are fixed to the male die 13 through a retainer 14 and a ring plate 15. The peripheral wall CW of the base material CP is press molded into a predetermined shape between the dies 16, 20 and the punch 12. The tooth profile forming die 20 has an inner peripheral surface formed in an inner tooth profile. The pad 17 presses the base material CP fitted to the punch 12 at a time of forming on the punch 12. In this case, reference symbol CW is attached to the peripheral wall of the base material CP before deformation, and reference numeral Z is attached to the peripheral wall of the base material CP (the clutch drum 1) after deformation, thereby differentiating the both of them.

As shown in FIG. 3B, a projecting portion 21 of the tooth profile forming die 20 is constituted by a taper portion (a first portion) 21a close to a closed end (an upper portion in the drawing) which inwardly deforms the peripheral wall CW of the base material CP of the clutch drum 1 at a predetermined amount, a small diameter portion (a second portion) 21b continuously provided in the taper portion 21a, and a taper portion (a third portion) 21c close to an open end (a lower portion in the drawing) which deforms the portion close to the open end of the clutch drum base material CP less than a predetermined amount. The recess portion 22 of the tooth profile forming die 20 is constituted by a taper portion (a first portion) 22a close to the closed end (the upper portion in the drawing) and having substantially an equal length M to each other in an axial direction, a taper portion (a third portion) 22c close to an open end (the lower portion in the drawing), and a small diameter portion (a second portion) 22b positioned between the taper portions 22a and 22c.

The taper portion 21c close to the open end of the projecting portion 21 has a length N in the axial direction larger than that of the taper portion 22c close to the open end of the base material of the recess portion 22. The taper portion 21a close to the closed end of the projecting portion 21 and the small diameter portion 21b respectively have length O and P in the axial direction smaller than that of the taper portion 22a close to the closed end of the recess portion 22 and the small diameter portion 22b. By using the tooth profile forming die 20, the peripheral wall Z of the clutch drum base material CP is formed in a tooth profile having different cross sectional shapes in the closed end section S, the center section T and the open end section U.

At a time of manufacturing the clutch drum 1 mentioned above, at first, the clutch drum base material CP formed in a cup shape is fitted to the punch 12 of the tooth profile forming apparatus, the clutch drum base material CP is pressed by the pad 17, and the dies 16 and 20 are descended together with the male die 13.

In this step, the closed end taper portion 21a and the small diamter portion 21b of the projecting portion 21 in the tooth profile forming die 20 deforms the peripheral wall CW of the base material CP at a predetermined amount, so that the closed end section S and the center section T are formed. Accordingly, the tooth profile portion 5 having an uneven amount necessary for transmitting a rotation is securely and easily formed. On the contrary, the open end taper portion 21c of the projecting portion 21 in the tooth profile forming die 20 deforms the open end portion of the clutch drum base material CP less than the predetermined amount, so that the open end section U is formed.

In all the sections S, T and U, the both end portions 7 in the peripheral direction among the inside projection portion 2 of the peripheral wall CW are extended thinner than the center portion 8 thereof by press molding. In the section U among all the sections S, T and U, a deformation amount is smaller than that of the other sections S and T, and both end portions 7a are thick. In other words, in the section U, a difference of the thickness is small between the center portion 8 and the both end portions 7a (refer to FIG. 2C). Accordingly, in the section U, the inside projecting portion 3 having a minimum outer diameter φR is larger than a predetermined groove diameter φD of the circumferential groove 4 for the snap ring is formed.

After forming the peripheral wall 2 in a predetermined tooth profile in this manner, a cut process is given to the open end portion of the inside projecting portion 3 so as to form the circumferential groove 4 for the snap ring, so that the clutch drum 1 is obtained. Since the minimum outer diameter φR of the open end portion of the inside projecting portion 3 is larger than the predetermined groove diameter φD of the circumferential groove 4 for the snap ring at a time of cutting, the bottom portion of the circumferential groove 4 is prevented from being produced an extending portion.

FIG. 3 shows an end surface of a clutch drum manufactured by a method of manufacturing a clutch drum in accordance with a second embodiment of the present invention.

In the method of manufacturing the clutch drum in accordance with this embodiment, a base material CPa for a clutch drum formed in a cup shape and having a peripheral wall CWa including a portion close to an open end formed in such a manner as to be thicker than the other portions is used. Accordingly, a minimum outer diameter φR of the open end portion in the inside projecting portion 33 formed at a stage of forming the peripheral wall CWa of the base material CPa in a predetermined tooth profile becomes larger than a predetermined groove diamter (a maximum diameter) φD of a groove 34 for mounting a snap ring. Therefore, by giving a cutting process to the open end portion of the inside projecting portion 33 after forming the peripheral wall CWa in a predetermined tooth profile, the circumferential groove 34 is formed without producing the extending portion.

At this time, since only the portion in which the circumferential groove 34 is formed is thick, the tooth profile necessary for transmitting a rotation is secured. Further, a weight thereof is slightly increased, however, a strength of the clutch drum 31 is increased at a degree that the open end portion of the inside projecting portion 33 having the circumferential groove 34 formed is made thicker than the other portion.

In this case, a detailed structure of a method of manufacturing a clutch drum and an apparatus for forming a tooth profile in accordance with the present invention is not limited to the structure of the embodiments mentioned above.

What is claimed is:

1. A cup-shaped clutch drum having a peripheral wall, comprising:

a tooth profile portion formed in the peripheral wall and having an inwardly projecting portion and an outwardly projecting portion; and a circumferential groove for mounting a snap ring on a portion close to an open end of the inside projecting portion, the circumferential groove being formed in the inner surface of the inwardly projecting portion;

wherein a minimum wall thickness of the portion close to the open end of the inside projecting portion is formed larger than a minimum wall thickness of other portions of the inside projecting portion which are axially displaced toward a bottom of the cup-shaped clutch drum;

an outer diameter of the portion close to the open end of the inwardly projecting portion is larger than a diameter of the circumferential groove.

2. A cup-shaped clutch drum as recited in claim 1, wherein the tooth profile portion has a closed side portion and an open side portion;

the inwardly projecting portion has a first inwardly projecting portion in the closed side portion and a second inwardly projecting portion in the open side portion, the second inwardly projecting portion comprising said circumferential groove; and a minimum outer diameter of the second inwardly projecting portion is larger than a minimum outer diameter of the first inwardly projecting portion.

3. A clutch drum as recited in claim 2, wherein the outwardly projecting portion has a first outside projecting portion in the closed side portion and a second outside projecting portion in the open side portion; and an outer diameter of the second outer projecting portion is substantially the same as an outer diameter of the first outer projecting portion.

4. A clutch drum as set forth in claim 2, wherein an outer diameter of the minimum wall thickness portion of the inwardly projecting portion is larger than a maximum diameter of the circumferential groove.

5. A clutch drum as set forth in claim 2, wherein the minimum wall thickness of the inwardly projecting portion reduces along an axial length of inwardly extending wall portion.

6. A clutch drum as recited in claim 1, wherein the tooth profile portion is formed by punch press die molding.

7. A clutch drum as recited in claim 6, wherein the drum member is formed in one-piece sheet metal.

8. A cup-shaped clutch drum as recited in claim 1, wherein a maximum wall thickness of the inwardly projecting portion is larger than a minimum wall thickness of an adjacent portion of the same inwardly projecting portion and wherein the minimum wall thickness of the inwardly projecting portion varies along an axial length of the inwardly projecting portion.

9. A cup-shaped clutch drum as recited in claim 8, wherein the minimum wall thickness of the inwardly projecting portion reduces along an axial length of the inwardly projecting portion.

10. A cup-shaped clutch drum having a bottom and adapted for use in an automatic transmission, comprising;

a set of outwardly projecting teeth extending axially along the drum, each tooth being spaced circumferentially from an adjacent tooth by an inwardly projecting tooth having a wall;

an annular groove located on an inner surface of the inwardly projecting tooth for receiving a snap ring, wherein a minimum wall thickness of the inwardly projecting tooth is made greater than a depth of the groove so that said groove is formed entirely within said wall of the inwardly projecting tooth; and wherein a minimum outer diameter of the inwardly projecting tooth at a position axially between the bottom and the groove is smaller than the minimum outer diameter of the inwardly projecting tooth at the position where the annular groove is formed;

wherein a maximum wall thickness of the inwardly projecting tooth is larger than a minimum wall thickness of an adjacent portion of the same inwardly projecting tooth and wherein the minimum wall thickness of the inwardly projecting tooth varies along an axial length of the inwardly extending wall portion; and wherein the minimum wall thickness of the inwardly projecting tooth reduces along an axial length of inwardly projecting tooth.

* * * * *